(12) United States Patent
Kim et al.

(10) Patent No.: US 12,479,582 B2
(45) Date of Patent: Nov. 25, 2025

(54) ENVIRONMENTAL CONTROL DEVICE OF AIRCRAFT AND METHOD FOR OPERATING ENVIRONMENTAL CONTROL DEVICE

(71) Applicants: Hyundai Motor Company, Seoul (KR); Kia Corporation, Seoul (KR)

(72) Inventors: Gwi Taek Kim, Incheon (KR); Ji Won Hwang, Seoul (KR); Mi Jin Kim, Gwacheon-si (KR); Woo Suk Jung, Gwangmyeong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 270 days.

(21) Appl. No.: 18/197,204

(22) Filed: May 15, 2023

(65) Prior Publication Data
US 2024/0166355 A1    May 23, 2024

(30) Foreign Application Priority Data

Nov. 21, 2022   (KR) .................. 10-2022-0156120

(51) Int. Cl.
*B64D 13/08*   (2006.01)
*B64D 13/06*   (2006.01)

(52) U.S. Cl.
CPC ...... *B64D 13/08* (2013.01); *B64D 2013/0618* (2013.01)

(58) Field of Classification Search
CPC .............. B60D 13/06; B60D 13/08; B60D 2013/0611; B60D 2013/0644; B60D 2013/0648; B60D 2013/0603; B60D 2013/0625; B60D 2041/005; B64D 13/06; B64D 13/08; B64D 2013/0611; B64D 2013/0644; B64D 2013/0648;
(Continued)

(56) References Cited

U.S. PATENT DOCUMENTS

| 6,058,715 A | 5/2000 | Strang et al. |
| 6,526,775 B1 | 3/2003 | Asfia et al. |

(Continued)

FOREIGN PATENT DOCUMENTS

| FR | 2829466 A1 | 3/2003 |
| JP | 2011504844 A | 2/2011 |

(Continued)

OTHER PUBLICATIONS

Feb. 16, 2024—European Search Report—EP Application No. 23197887.5.
Apr. 15, 2025—(EP) Office Action—App 23197887.5.

*Primary Examiner* — Marc E Norman
(74) *Attorney, Agent, or Firm* — Banner & Witcoff, Ltd.

(57) ABSTRACT

An environmental control device includes a shaft installed in an aircraft and coupled to a motor to be rotatable; a compressor connected to the shaft to be rotatable, the compressor adiabatically compressing external air introduced into the aircraft to form a flow of compressed air having a raised temperature; a heat exchanger allowing heat exchange between the compressed air having a raised temperature and a portion of the external air introduced into the aircraft; and a turbine connected to the shaft to be rotatable, the turbine adiabatically expanding the heat-exchanged compressed air to form a flow of chilling air.

19 Claims, 7 Drawing Sheets

(58) Field of Classification Search
CPC .... B64D 2013/0603; B64D 2013/0625; B64D 2041/005
See application file for complete search history.

(56) References Cited

U.S. PATENT DOCUMENTS

| | | |
|---|---|---|
| 10,224,556 B2 | 3/2019 | Lents et al. |
| 10,501,191 B1 | 12/2019 | Dooley et al. |
| 2009/0211273 A1 | 8/2009 | Klewer |
| 2009/0309364 A1 | 12/2009 | Marconi |
| 2011/0138822 A1 | 6/2011 | Dittmar et al. |
| 2016/0083100 A1 | 3/2016 | Bammann et al. |
| 2016/0272331 A1 | 9/2016 | Houssaye |
| 2017/0170494 A1 | 6/2017 | Lents et al. |
| 2018/0281976 A1 | 10/2018 | Zywiak et al. |
| 2020/0075971 A1 | 3/2020 | Lo et al. |
| 2022/0033087 A1 | 2/2022 | Bruno et al. |
| 2023/0365263 A1* | 11/2023 | Wang ................. B64D 13/08 |

FOREIGN PATENT DOCUMENTS

| | | |
|---|---|---|
| JP | 5204772 B2 | 6/2013 |
| JP | 5269780 B2 | 8/2013 |
| KR | 102129153 B1 | 7/2020 |

\* cited by examiner

ENVIRONMENTAL CONTROL DEVICE OF AIRCRAFT AND METHOD FOR OPERATING ENVIRONMENTAL CONTROL DEVICE

CROSS-REFERENCE TO RELATED APPLICATION(S)

This application claims benefit of priority to Korean Patent Application No. 10-2022-0156120 filed on Nov. 21, 2022 in the Korean Intellectual Property Office, the disclosure of which is incorporated herein by reference in its entirety.

FIELD

The present disclosure relates to an environmental control device of an aircraft capable of providing compressed air or chilling air required for a fuel cell powertrain in addition to controlling in-flight temperature, pressure, humidity, and the like of an electric propulsion aircraft, and a method for operating the environmental control device.

BACKGROUND

Aircraft may be equipped with environmental control devices. An environmental control device may extract high-temperature and high-pressure compressed air from an engine, and the extracted compressed air may be supplied to a cabin or cockpit after temperature and pressure thereof are adjusted using an air conditioning device.

The environmental control device may perform various functions, such as controlling pressure of an interior space, supplying sufficient air to allow people to stay comfortably in the interior space, and controlling humidity and heating/cooling of the interior space.

As an air conditioner, an air cycle machine including, for example, one or more heat exchangers, a compressor, and one or more turbines may be used. Such an air cycle machine may be configured to obtain bleed air from an engine.

As the electrification of aircraft progresses in stages, a method for operating an air cycle machine by coupling a motor to the air cycle machine and supplying electricity generated by an engine may be used. In such an implementation, the air cycle machine may also be linked to the engine in terms of energy supply.

An electric propulsion aircraft using a fuel cell as a power source has been researched and developed. However, in this case, a motor, an inverter, and the like replace the engine, and thus a new environmental control device for controlling in-flight temperature, pressure, humidity, and the like, without an engine, may be required. Moreover, a device for thermal management of a fuel cell powertrain may be additionally required.

Descriptions in this background section are provided to enhance understanding of the background of the disclosure, and may include descriptions other than those of the prior art already known to those of ordinary skill in the art to which this technology belongs.

SUMMARY

The following summary presents a simplified summary of certain features. The summary is not an extensive overview and is not intended to identify key or critical elements.

An aspect of the present disclosure provides an environmental control device of an aircraft capable of providing compressed air or chilling air required for a fuel cell powertrain in addition to controlling in-flight temperature, pressure, humidity, and the like of an electric propulsion aircraft, and a method for operating the environmental control device.

An environmental control device may comprise: a shaft installed in an aircraft and coupled to a motor, wherein the motor is configured to rotate the shaft; a compressor connected to the shaft, wherein the compressor is configured to compress external air introduced into the aircraft to form a flow of compressed air having a raised temperature; a heat exchanger configured to allow a heat exchange between the compressed air having the raised temperature and a portion of additional external air introduced into the aircraft; and a turbine coupled to the shaft, wherein the turbine is configured to expand the heat-exchanged compressed air to form a flow of chilling air.

The aircraft may comprise: a first air scoop through which external air is introduced; a second air scoop through which external air is introduced; a first external air line forming a flow path from the first air scoop to the compressor; and a second external air line forming a flow path from the second air scoop to the compressor. The external air of the second air scoop may be ram air.

The compressor may comprise a first stage compressor and a second stage compressor. A pressurization line may be connected between an outlet of the first stage compressor and an inlet of the second stage compressor. The first external air line may be connected to an inlet of the first stage compressor. The second external air line may be connected to the pressurization line to be in communication with the second stage compressor.

A first introduction line, connecting the first air scoop and an interior space of the aircraft, and a second introduction line, connecting the first air scoop and the heat exchanger, may be branched from the first external air line. An air intake fan may be installed in each of the first introduction line and the second introduction line.

A first heating line may be connected to the second introduction line downstream of the heat exchanger. A heating heat exchanger may be disposed between the first heating line and the first introduction line.

The environmental control device may comprise: a first exhaust line connected to the first heating line downstream of the heating heat exchanger; a second exhaust line connected upstream of the heating heat exchanger in the first heating line; and a first valve installed between the first heating line and the second exhaust line.

The environmental control device may comprise: a bootstrap line allowing an outlet of the compressor and an inlet of the turbine to be in communication with each other, wherein the bootstrap line has the heat exchanger disposed thereon; and a first air supply line branched from the bootstrap line to supply the compressed air to an air supply device in the aircraft.

A second heating line may be connected between the first air supply line and the first introduction line. A second valve may be installed between the first air supply line and the second heating line. A third valve may be installed between the first introduction line and the second heating line.

A third introduction line, connecting the second air scoop and the interior space of the aircraft, and a fourth introduction line, connecting the second air scoop and the heat exchanger, may be branched from the second external air line. The third introduction line may be connected to the first introduction line. The fourth introduction line may be connected to the second introduction line.

The environmental control device may comprise: a second air supply line connected to the second external air line to supply ram air to an air supply device in the aircraft.

The air supply device may be provided in a fuel cell powertrain of the aircraft to supply air to a fuel cell stack.

A fifth valve may be installed to selectively connect at least two of the second external air line, the second air supply line, and the pressurization line.

The environmental control device may comprise: a redundancy line connected between the third introduction line and the pressurization line to supply air compressed by the first stage compressor, together with the ram air; and a seventh valve installed between the redundancy line and the third introduction line.

The environmental control device may comprise: a first on-off valve installed in the first external air line; and a second on-off valve installed in the fourth introduction line. The first on-off valve and the second on-off valve are opened and closed in opposite manners (e.g., the first on-off valve is opened when the second on-Off valve is closed or the first on-off valve is closed when the second on-Off valve is opened).

The environmental control device may comprise: a chilling line connected to the turbine to supply chilling air to a heat dissipator in the aircraft.

The heat dissipator may be provided in a fuel cell powertrain of the aircraft.

A cooling line may be connected to the chilling line. A cooling heat exchanger may be disposed between the cooling line and a first introduction line. A fourth valve may be installed between the cooling line and the chilling line.

These and other features and advantages are described in greater detail below.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
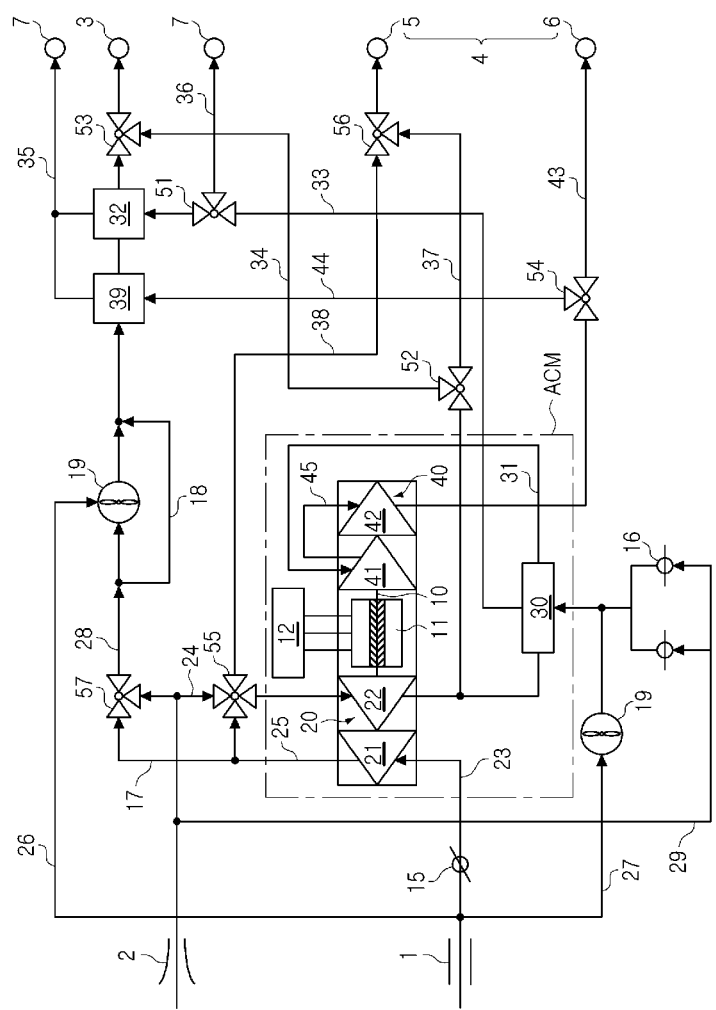
FIG. 1 is a configuration diagram illustrating an environmental control device of an aircraft.

Hereinafter, the present disclosure will be described in detail with reference to exemplary drawings. In adding reference numerals to components of each drawing, it should be noted that the same components are indicated by the same numerals even though displayed on different drawings. The terms "first," "second," "third," and the like may be used to describe various components. However, the terms do not limit a sequence, size, position, importance, and the like of components, and are used only to distinguish a component from another component.

An aircraft may refer to a mobility vehicle capable of moving by flying in the sky. For example, the aircraft, in addition to referring to a helicopter, drone, tilt rotor aircraft, fixed-wing airplane, and the like, may include vehicles capable of flying in a state in which the vehicles move on the ground using wheels, and then the wheels are separated from the ground. The aircraft may include a manned aircraft and an unmanned aircraft. The manned aircraft may include an airframe capable of operating autonomously in addition to an airframe controlled by a pilot.

For ease of description, various aspects of the present disclosure are described and illustrated mainly with an example in which an environmental control device is applied to an electric propulsion aircraft using a fuel cell as a power source, but aspects of the present disclosure are not necessarily limited thereto. For example, compressed air and chilling air flowing in the environmental control device may be provided to other uses in the aircraft.

FIG. 1 is a configuration diagram illustrating an environmental control device of an aircraft.

As illustrated in FIG. 1, an environmental control device of an aircraft may include a shaft 10, a compressor 20, a heat exchanger 30, and a turbine 40.

The environmental control device illustrated in FIG. 1 may be connected, for example, between air scoops 1 and 2 and an interior space 3, such as a cabin or a cockpit, and between the air scoops 1 and 2 and a fuel cell powertrain 4 in an aircraft. This environmental control device may be configured based on an air cycle machine ACM.

In the air cycle machine ACM, the shaft 10 may connect the compressor 20 and the turbine 40, and the heat exchanger may be disposed in a bootstrap line 31 allowing an outlet of the compressor 20 and an inlet of the turbine 40 to be in communication with each other. A plurality of compressors and a plurality of turbines 40 may be provided, respectively, such that a multi-stage compressor and a multi-stage turbine may be configured.

In the air cycle machine ACM, a motor 11 driven by power from the inverter 12 may be connected to or coupled onto the shaft 10. Driving of the motor 11 may enable low-pressure external air to be used.

External air may be adjusted by the environmental control device according to the present disclosure, and may be distributed to a cabin, cockpit, other internal volumes, and the like in the aircraft through each line including a duct or pipe. The external air may create a fresh indoor environment by controlling internal temperature, pressure, humidity, and the like of the aircraft and ventilating the interior of the aircraft. The external air may be exhausted out of the aircraft or circulated back into the aircraft. For example, external air lines 23 and 24 for introducing external air into the inlet of the compressor 20, a chilling line 43 for transferring chilling air from an outlet of the turbine 40 to the fuel cell powertrain 4, a first heating line 33 for providing high-temperature external air from the heat exchanger 30, and a second heating line 34 for supplying compressed air having a raised temperature from the outlet of the compressor 20 to the interior space 3 or the fuel cell powertrain 4 may be connected to the air cycle machine ACM.

The heat exchanger 30 may perform a heat exchange between external air compressed adiabatically by the compressor 20, that is, compressed air, and a portion of external air directly introduced from the air scoops 1 and 2 by bypassing the compressor 20, such that a portion of the external air may obtain heat from the compressed air having a raised temperature by the compressor 20, and may cool the compressed air.

The compressed air may pass through the heat exchanger 30, and may be input to the inlet of the turbine 40, such that the compressed air may be further cooled while being adiabatically expanded in the turbine 40, thereby forming chilling air. The chilling air may be output from the turbine 40 to the chilling line 43.

Accordingly, the environmental control device of the aircraft may have increased efficiency and increased chilling performance using processes of heat transfer, adiabatic compression, and adiabatic expansion at constant pressure.

In at least some implementations, a plurality of air scoops 1 and 2 may be provided, including, for example, a first air scoop 1 and a second air scoop 2. External air separately introduced through the first air scoop 1 and the second air scoop 2 may flow along different paths in the aircraft, and may flow out of the environmental control device. Optionally, the separately introduced external air may be mixed in the environmental control device, and may be discharged.

The external air lines 23 and 24 may include a first external air line 23 connected to the first air scoop 1, and a second external air line 24 connected to the second air scoop 2. The external air lines 23 and 24 may refer to flow paths from the air scoops 1 and 2 to the compressor 20.

If a plurality of compressors 20 are provided, a pressurization line 25, allowing a first stage compressor 21 and a second stage compressor 22 to be in communication with each other, may be connected between an outlet of the first stage compressor 21 and an inlet of the second stage compressor 22. In this case, the first external air line 23 may be connected to an inlet of the first stage compressor 21 to be in communication with the second stage compressor 22 through the pressurization line 25. The second external air line 24 may be connected to the pressurization line 25 to be communication with the second stage compressor 22.

A first introduction line 26, connecting the first air scoop 1 and the interior space 3 to each other, and a second introduction line 27, connecting the first air scoop 1 and the heat exchanger 30 to each other, may be branched from the first external air line 23.

An air intake fan 19 may be installed in each of the first introduction line 26 and the second introduction line 27, such that the introduction of external air may be promoted and a flow rate may be provided. In at least some implementations, when the air intake fan 19 does not operate, there may be almost no flow of air through the first introduction line 26 and the second introduction line 27, such that the air intake fan 19 may act as a type of on-off valve.

The first introduction line 26 may supply external air introduced into the aircraft through the first air scoop 1 to the interior space 3. The external air may act as indoor circulation air and transfer heat and chill.

The first heating line 33 may be connected to the second introduction line 27 downstream of the heat exchanger 30. External air in the first heating line 33 may supply heat received from compressed air, passing through the heat exchanger 30 by the bootstrap line 31, to the interior space 3.

To this end, a heating heat exchanger 32 may be disposed between the first heating line 33 and the first introduction line 26, such that the heat of the first heating line 33 may be transferred to the external air in the first introduction line 26 flowing into the interior space 3. Thus, heating may be performed by providing heat to the interior space 30.

A first exhaust line 35 may be connected to the first heating line 33 downstream of the heating heat exchanger 32. The first exhaust line 35 may exhaust heat-exchanged external air to the outside of the aircraft through an exhaust port 7.

The first heating line 33 may be connected to a second exhaust line 36 upstream of the heating heat exchanger 32. The second exhaust line 36 may exhaust heat-exchanged external air to the outside of the aircraft through the exhaust port 7.

To this end, a first valve 51 may be installed between the first heating line 33 and the second exhaust line 36. In an example, a three-way valve may be employed as the first valve 51. The first heating line 33 may selectively supply heat to the heating heat exchanger 32 by the first valve 51, such that heating may be performed or stopped in addition to the adjustment of the temperature of the interior space 3.

A first air supply line 37 for supplying air for generation of electricity to a fuel cell stack of the fuel cell powertrain 4 by connecting the compressor 20 and an air supply device 5 of the fuel cell stack to each other may be branched from the bootstrap line 31. Accordingly, the environmental control device of the aircraft may supply compressed air pressurized at a predetermined pressure to the fuel cell stack.

The second heating line 34 may be connected between the first air supply line 37 and the first introduction line 26 to supply compressed air having a raised temperature with a predetermined pressure to the interior space 3. A second valve 52 may be installed between the first air supply line 37 and the second heating line 34, and a third valve 53 may be installed between the first introduction line 26 and the second heating line 34. In an example, three-way valves may be employed as the second valve 52 and the third valve 53, respectively.

The second heating line 34 may selectively supply the compressed air having a raised temperature to the interior space 3 by the second valve 52 and the third valve 53, such that heating and supply of compressed air may be performed or stopped in addition to the adjustment of the temperature and pressure of the interior space 3.

If a plurality of turbines 40 are provided, an expansion line 45, allowing a first stage turbine 41 and a second stage turbine 42 to be in communication with each other, may be connected between an outlet of the first stage turbine 41 and an inlet of the second stage turbine 42. In this case, the chilling line 43 may communicate with an outlet of the second stage turbine 42.

The chilling line 43 may connect the turbine 40 and a heat dissipator 6 of the fuel cell powertrain 4. Chilling air, adiabatically expanded and discharged from the turbine 40, may cool the heat dissipator 6 of the fuel cell powertrain 4. Thus, the environmental control device of the aircraft may ensure chilling performance of the fuel cell powertrain 4.

The heat dissipator 6 may include, for example, a radiator formed to allow coolant to cool the fuel cell powertrain 4 or avionics equipment to pass through the interior thereof. Chilling air may exchange heat with coolant in the radiator while passing through the radiator, thereby chilling the coolant. However, the form of the heat dissipator 6 is not necessarily limited to the above-described example.

A cooling line 44 may be connected to the chilling line 43 extending from the outlet of the turbine 40. The cooling line 44 may supply, to the interior space 3, chill of chilling air branched and flowing from the chilling line 43.

To this end, a fourth valve 54 may be installed between the cooling line 44 and the chilling line 43. A three-way valve may be employed as the fourth valve 54.

A cooling heat exchanger 39 may be disposed between the cooling line 44 and the first introduction line 26 to transfer chill of the cooling line 44 to external air of the first introduction line 26 flowing into the interior space 3. Thus, cooling may be performed by supplying chill to the interior space 3.

The cooling line 44 may be connected to the first exhaust line 35 downstream of the cooling heat exchanger 39. The first exhaust line 35 may exhaust the heat-exchanged chilling air to the outside of the aircraft through the exhaust port 7.

By the fourth valve 54, the cooling line 44 may selectively take heat away from external air and supply chill to the external air by the cooling heat exchanger 39, such that cooling may be performed or stopped in addition to the adjustment of the temperature of the interior space 3.

A third introduction line 28, connecting the second air scoop 2 and the interior space 3 to each other, and a fourth introduction line 29, connecting the second air scoop 2 and the heat exchanger 30 to each other, may be branched from the second external air line 24.

The fourth introduction line 29 may be connected to the second introduction line 27. As described above, the first heating line 33 may be connected to the second introduction line 7 downstream of the heat exchanger 30. Thus, heat may be provided to the interior space 3, such that heating may be performed.

A second air supply line 38 for supplying air for generation of electricity to the fuel cell stack of the fuel cell powertrain 4 by connecting the second air scoop 2 and the air supply device 5 of the fuel cell stack to each other may be connected to the second external air line 24.

If a plurality of compressors 20 are provided, as described above, the second external air line 24 may be connected to the pressurization line 25 to be in communication with the second stage compressor 22. For branching and connection, and selection of a flow path, a fifth valve 55 may be installed between the second external air line 24, the second air supply line 38, and the pressurization line 25. In an example, a four-way valve may be employed as the fifth valve 55.

The second air supply line 38 may be connected to the first air supply line 37. For branching and connection, and supply or control of compressed air, a sixth valve 56 may be installed between the second air supply line 38 and the first air supply line 37. In an example, a three-way valve may be employed as the sixth valve 56.

By the fifth valve 55 and the sixth valve 56, the second air supply line 38 and the first air supply line 37 may supply compressed air having a raised temperature together with external air of the second air scoop 2 to the air supply device 5 of the fuel cell stack, such that a sufficient amount of air required by the fuel cell stack may be supplied.

The third introduction line 28 may be connected to the first introduction line 26 through the air intake fan 19. Optionally, the third introduction line 28 may be connected to the first introduction line 26 through a bypass line 18 bypassing the air intake fan 19.

A redundancy line 17 may be connected between the third introduction line 28 and the pressurization line 25. Thus, when there is demand for pressurization of the interior space 3, compressed air compressed by the first stage compressor 21 may be additionally supplied together with the external air of the second air scoop 2.

To this end, a seventh valve 57 may be installed between the redundancy line 17 and the third introduction line 28. In an example, a three-way valve may be employed as the seventh valve 57.

For example, if the inflow of external air and pressure from the second air scoop 2 decrease, the external air may be supplied from the first air scoop 1 to the compressor 20 through the first external air line 23, and compressed air may be supplied to the third introduction line 28 by the seventh valve 57, thereby maintaining and supplementing the flow of air supplied to the interior space 3.

As the above-described three-way valve and four-way valve, an electric valve, driven by a driving motor (not illustrated) connected to a power source under the control of a controller (not illustrated) to be described below, may be employed. An internal valve body may rotate at predetermined angle with respect to a zero point according to driving of the driving motor, and thus opening/closing or an opening degree of the electric valve may be controlled, such that a direction of air flow and a flow path of air may be determined. A flow rate of air flowing through each line may be adjusted.

A first on-off valve 15 and a second on-off valve 16 may be installed in the first external air line 23 and the fourth introduction line 29 to supply or control external air, respectively. The first on-off valves and second on-off valves may be opened and closed and may operate in opposite manners. For example, when the first on-off valve is opened to be ON, the second on-off valve 16 may be closed to be OFF, whereas when the first on-off valve 15 is closed to be OFF, the second on-off valve 16 may be opened to be ON.

The environmental control device of the aircraft may operate in a take-off and landing mode and a cruise mode by operation of first on-off valve 15, the air intake fan 19, the second on-off valve 16, the fifth valve 55, and/or the seventh valve 57.

The take-off and landing mode and the cruise mode may be determined based on a reference altitude value of the aircraft and a reference temperature value of the external air. For example, when an altitude of the aircraft is 6.6 km or higher and a temperature of the external air is −27° C. or lower, the environmental control device may operate in the cruise mode. When an altitude value of the aircraft is less than the reference altitude value and a temperature value of the external air is greater the reference value, the environmental control device may operate in the take-off and landing mode.

However, reference values of the cruise mode are not limited to the above-described example. The altitude of the cruise mode may be selected from within a range of 6.6 km to 13 km, and the temperature of the external air may be selected from within a range from −27° C. to −69° C. For example, in the take-off and landing mode, the first on-off valve 15 may be opened to be ON and the air intake fans 19 may operate. In the take-off and landing mode, the second on-off valve 16 may be closed to be OFF, a port of the fifth valve 55 toward the second external air line 24 may be closed, and all ports of the seventh valve 57 may be closed.

In the cruise mode, the first on-off valve 15 may be closed to be OFF and the air intake fans 19 may not operate. In the cruise mode, the second on-off valve 16 may be opened to be ON, a port of the fifth valve 55 toward the second external air line 24, a port of the pressurization line 25 toward the second stage compressor 22, and a port of the pressurization line 25 toward the second air supply line 38 may be opened, and a port of the seventh valve 57 toward the second external air line 24 and a port of the seventh valve 57 toward the third introduction line 28 may be opened.

Here, in the cruise mode, external air introduced into the aircraft through the second air scoop 2 and the second external air line 24 may be referred to as "ram air." The cruise mode may be a mode using ram air generated by the operation of the aircraft and introduced into the aircraft with a predetermined pressure. Ram air may also be used in other systems or other components within the aircraft.

For example, according to an altitude of the aircraft and a temperature of external air detected by an altitude sensor and an external air temperature sensor of the aircraft, the controller (not illustrated) may determine whether to execute the take-off and landing mode or the cruise mode. As a result, one of the two modes may be selected, and the on-off valves 15 and 16, the fifth valve 55, and the air intake fan 19 may be controlled so as to allow the external air to be supplied to the compressor 20 and the heat exchanger 30.

The controller may be electrically connected to the altitude sensor, the external air temperature sensor, an indoor temperature sensor, a pressure sensor, a humidity sensor, an air flow sensor, and the like of the aircraft to receive a detection signal. The controller may be electrically connected to the motor 11, the inverter 12, the on-off valves 15 and 16, the valves 51 to 57, the air intake fan 19, and the like to transmit an instruction signal for controlling the operation of the above-described components.

The controller may include a plurality of electrical and electronic components respectively providing power and operational control to related components. For example, the controller may include a programmable processing unit such as a microprocessor having a built-in semiconductor chip capable of performing various calculations or instructions, a memory, and the like.

The controller may exchange various pieces of information or signals for operation with a corresponding component through a communication link. As the communication link, for example, wireless communication such as a local area network or the like may be employed, but the communication link is not necessarily limited thereto, and wired, wired/wireless, or optical communication may be applied.

For example, the controller may be integrated into an upper control system of the aircraft or used in combination. Alternatively or additionally, the controller may be linked to at least one of other control systems, such as an air supply control system, an indoor air conditioning and temperature control system, a machine control system, a hydraulic control system, an electrical control system, a fuel cell air supply control system, a heat management control system, and the like.

Hereinafter, a method for operating an environmental control device configured as above will be described below.

The method for operating an environmental control device may include forming a flow of compressed air having a raised temperature by adiabatically compressing external air introduced into an aircraft by the compressor 20, allowing, by the heat exchanger 30, heat exchange between the compressed air having a raised temperature and a portion of the external air introduced into the aircraft, and forming a flow of chilling air by adiabatically expanding, by the turbine 40, the heat-exchanged compressed air.

In describing the method, further description of a control relationship of the motor 11, the inverter 12, the on-off valves 15 and 16, the valves 51 to 57, the air intake fan 19, and the like by the controller may be omitted.

As described above, the take-off and landing mode and the cruise mode may be determined based on a reference altitude value of the aircraft and a reference temperature value of the external air. The take-off and landing mode may be executed when the aircraft is approximately on the ground or near the ground, and the cruise mode may be executed, for example, when an altitude of the aircraft is 6.6 km or higher and a temperature of the external air is −27° C. or lower.

For example, if the take-off and landing mode is performed, the environmental control device may operate using external air introduced through the first air scoop 1 and the first external air line 23. In the cruise mode, the environmental control device may operate using external air introduced through the second air scoop 2 and the second external air line 24, that is, ram air.

In the take-off and landing mode, air supply to a fuel cell powertrain 4 may be performed without heating, cooling, and air conditioning of an interior space. Such examples are described with reference to the drawings. In the drawings, a flow path indicated by a relatively thick solid line indicates a flow path through which air flows, and an open port indicated by an empty triangle in a three-way valve or a four-way valve indicates a flow of air.

For clear understanding, external air flowing in the environmental control device in the take-off and landing mode may be divided into first atmosphere, second atmosphere, third atmosphere, compressed air, chilling air, heating air, and cooling air. It should be noted that the first atmosphere, second atmosphere, third atmosphere, compressed air, chilling air, heating air, or cooling air has the same chemical composition although there is a change in temperature, pressure, and the like.

Figure 2:
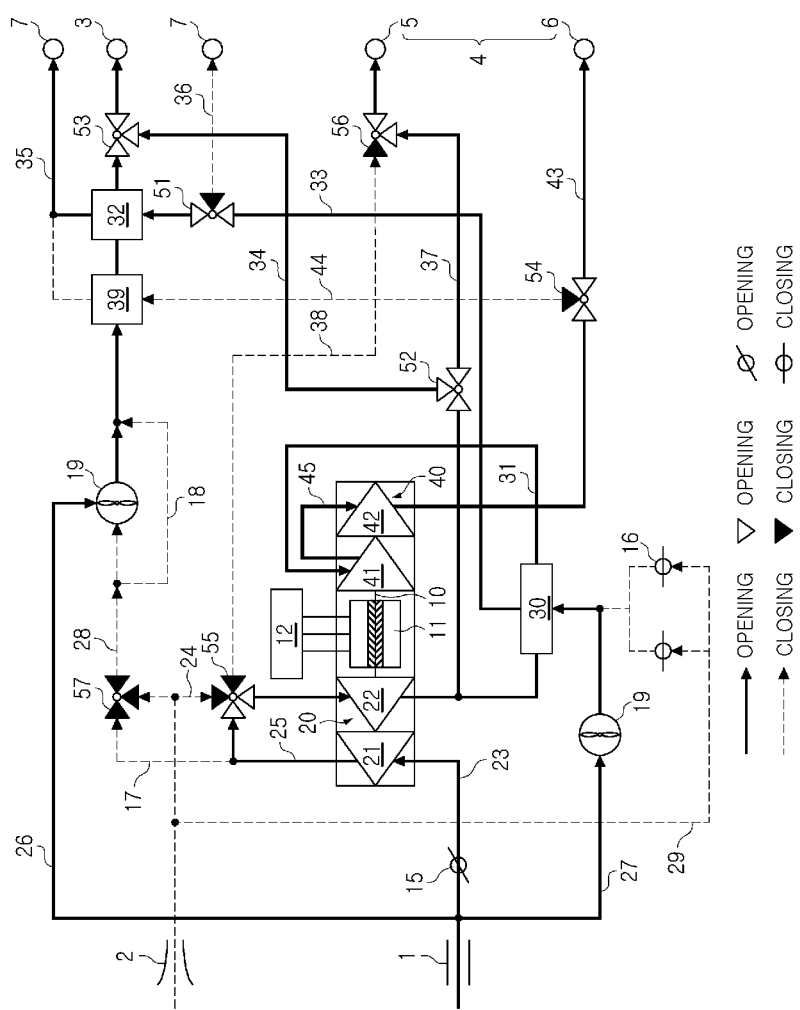
FIG. 2 is a diagram illustrating a case in which an environmental control device of an aircraft operates for heating of an interior space in a take-off and landing mode.

FIG. 2 is a diagram illustrating a case in which an environmental control device of an aircraft operates for heating of an interior space in a take-off and landing mode.

In a take-off and landing mode, air in the first atmosphere may be compressed to become compressed air having a raised temperature. Before a heat exchange operation, a portion of the compressed air may be supplied to the interior space 3 of the aircraft. In the heat exchange operation, air in the second atmosphere may exchange heat with the compressed air to become the second atmosphere having a raised temperature. Air in the second atmosphere having a raised temperature may exchange heat with air in the third atmosphere flowing into the interior space 3 to heat the interior space 3.

In an example, in the take-off and landing mode, the first on-off valve 15 may be opened to be ON, and the air intake fans 19 may operate. The motor 11 may be driven by power from the inverter 12 to rotate the shaft 10. Thus, the compressor 20 and the turbine 40 may rotate.

External air around the aircraft may be introduced into the aircraft through the first air scoop 1, and air in the first atmosphere flowing along the first external air line 23 may flow up to the compressor 20. If a plurality of compressors 20 are provided, air in the first atmosphere may enter an inlet of the first stage compressor 21, and may be primarily adiabatically compressed to become compressed air with a raised temperature. Subsequently, the compressed air may flow out of an outlet of the first stage compressor 21 and flow along the pressurization line 25.

In this case, a port of the fifth valve 55 forward the second external air line 24 and a port of the fifth valve 55 toward the second supply air line 38 may be closed. The second on-off valve 16 of the fourth introduction line 29 branched from the second external air line 24 and all ports of the seventh valve 57 may be closed. Thus, even when that external air from the second air scoop 2 is introduced, external air in the second external air line 24 may not flow in the environmental control device, in particular, the air cycle machine ACM.

The primarily compressed air may enter an inlet of the second stage compressor 22 through the fifth valve 55 and the pressurization line 25. The primarily compressed air may be secondarily adiabatically compressed by the second stage compressor 22 to become compressed air with a further raised temperature. Subsequently, the compressed air may flow out of an outlet of the second stage compressor 22 and flow up to the heat exchanger 30 along the bootstrap line 31.

In the heat exchanger 30, the compressed air may exchange heat with the second atmosphere bypassing the compressor 20 along the second introduction line 27 from the first air scoop 1 and passing through the intake air fan 19. Thus, the second atmosphere may obtain heat from the compressed air having a raised temperature to become the second atmosphere having a raised temperature, and the compressed air may be chilled.

The compressed air, passing through the heat exchanger 30, may continue to flow up to the turbine 40 along the bootstrap line 31. If a plurality of turbines 40 are provided, the compressed air may enter an inlet of the first stage turbine 41, and may be primarily adiabatically expanded to become chilled chilling air. The chilling air may flow out of an outlet of the first stage turbine 41 and may flow along the expansion line 45.

The primarily expanded chilling air may enter an inlet of the second stage turbine 42 through the expansion line 45. The primarily expanded chilling air may be secondarily adiabatically expanded in the second stage turbine 42 to become further chilled chilling air. The chilling air may be supplied from an outlet of the second stage turbine to the heat dissipator 6 of the fuel cell powertrain 4 along the chilling line 43.

In this case, a port of the fourth valve 54 toward the cooling line 44 may be closed, such that the chilling air may not flow into the cooling line 44.

Air compressed by the compressor 20 may be supplied to the air supply device 5 of the fuel cell stack along the first air supply line 37 branched from the bootstrap line 31.

In this case, a port of the second valve 52 toward the second heating line 34 may be opened, and the compressed air having a raised temperature may be supplied to the interior space 3 through the first introduction line 26 with a predetermined pressure. Thus, heating of the interior space 3 may be performed.

The high-temperature second atmosphere passing through the heat exchanger 30 may flow to the heating heat exchanger 32 along the first heating line 33.

In the heating heat exchanger 32, air in the high-temperature second atmosphere may exchange heat with air in the third atmosphere flowing from the first air scoop 1 along the first introduction line 26 and passing through the intake air fan 19. Thus, air in the third atmosphere may obtain heat from the high-temperature second atmosphere to become high-temperature heating air, and may be supplied to the interior space 3. Accordingly, heating of the interior space 3 may be additionally performed.

The heat-exchanged second atmosphere may be exhausted out of the aircraft through the first exhaust line 35.

Figure 3:
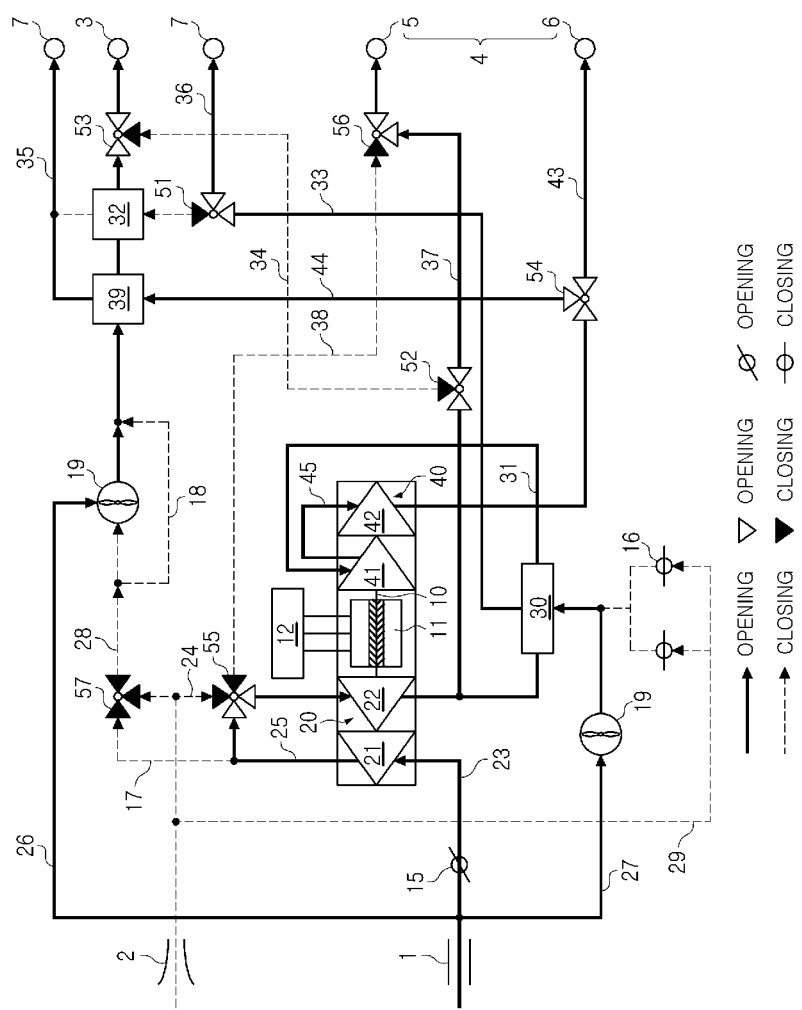
FIG. 3 is a diagram illustrating a case in which an environmental control device of an aircraft operates for cooling of an interior space in a take-off and landing mode.

FIG. 3 is a diagram illustrating a case in which an environmental control device of an aircraft operates for cooling of an interior space in a take-off and landing mode.

In a take-off and landing mode, air in the first atmosphere may be compressed. The compressed air may exchange heat with air in the second atmosphere, and may be expanded to form chilling air. A portion of the chilling air may exchange heat with third atmosphere flowing into the interior space 3 of the aircraft to cool the interior space 3.

In an example, a process in which external air is introduced into the aircraft through the first air scoop 1 and passes through the air cycle machine ACM to become chilling air, and the chilling air is supplied to the heat dissipator 6 of the fuel cell powertrain 4 along the chilling line 43 may be the same as the process described with reference to FIG. 2.

If the chilling air is supplied to the heat dissipator 6 of the fuel cell powertrain 4 along the chilling line 43, a port of the fourth valve 54 toward the cooling line 44 may also be opened, such that the chilling air may flow up to the cooling heat exchanger 39 along the cooling line 44.

In the cooling heat exchanger 39, the chilling air may exchange heat with air in the third atmosphere flowing from the first air scoop 1 along the first introduction line 26 and passing through the intake air fan 19. Thus, heat of the third atmosphere may be taken away by the chilling air, so that air in the third atmosphere may become low-temperature cooling air, and may be supplied to the interior space 3. Accordingly, cooling of the interior space 3 may be performed.

The heat-exchanged chilling air may be exhausted out of the aircraft through the first exhaust line 35.

Air compressed by the compressor 20 may be supplied to the air supply device 5 of the fuel cell stack along the first air supply line 37 branched from the bootstrap line 31.

In this case, ports of the second valve 52 and the third valve 53 toward the second heating line 34 may be closed, such that the compressed air may not flow into the second heating line 34.

The high-temperature second atmosphere, passing through the heat exchanger 30, may flow along the first heating line 33. However, a port of the first valve 51 toward the heating heat exchanger 32 may be closed, such that the high-temperature second atmosphere may be exhausted out of the aircraft through the second exhaust line 36.

Figure 4:
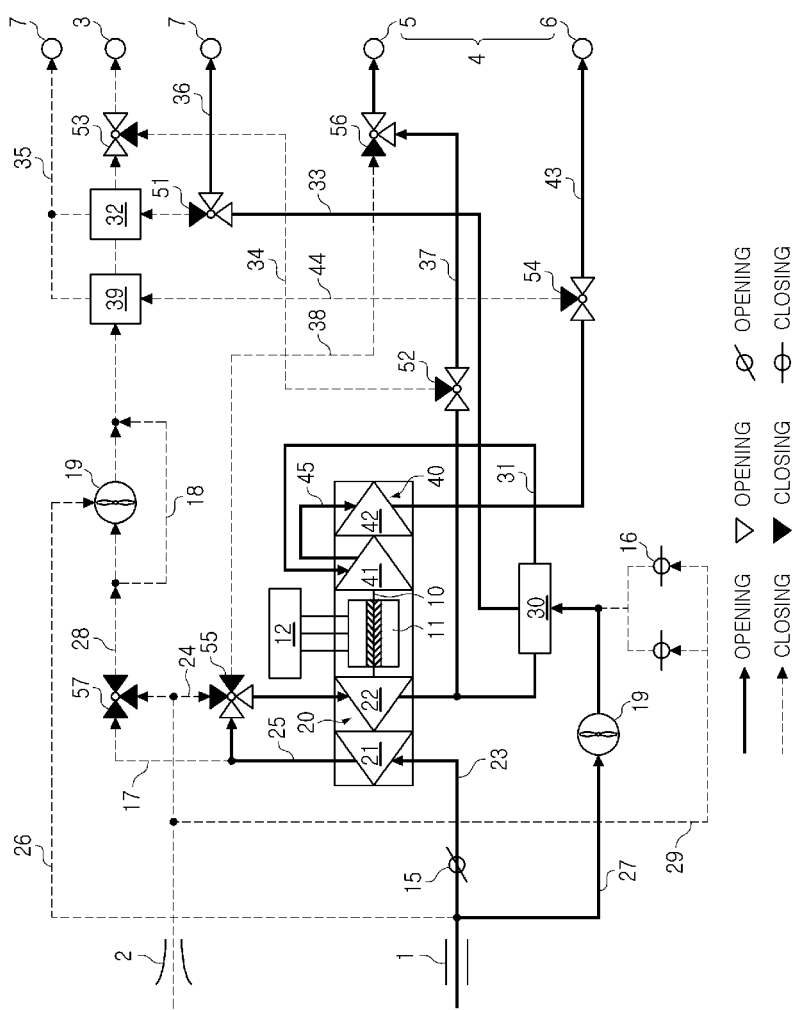
FIG. 4 is a diagram illustrating a case in which an environmental control device of an aircraft supplies air only to a fuel cell powertrain in a take-off and landing mode.

FIG. 4 is a diagram illustrating a case in which an environmental control device of an aircraft supplies air only to a fuel cell powertrain in a take-off and landing mode.

In a take-off and landing mode, air in the first atmosphere may be compressed to become compressed air having a raised temperature. Before a heat exchange operation, a portion of the compressed air may be supplied to the air supply device 5 in the aircraft. The compressed air may exchange heat with second atmosphere and may be expanded to form chilling air, and the chilling air may be supplied to the heat dissipator 6 in the aircraft.

In this case, the air intake fan 19 disposed in the first introduction line 26 may not operate, such that air in the third atmosphere from the first air scoop 1 may not flow along the first introduction line 26. Accordingly, the environmental control device may not perform a function of air conditioning.

A process in which external air is introduced into the aircraft through the first air scoop 1 and passes through the air cycle machine ACM to become chilling air, and the chilling air is supplied to the heat dissipator 6 of the fuel cell powertrain 4 along the chilling line 43 may be the same as the process described with reference to FIG. 2.

If the chilling air is supplied to the heat dissipator 6 of the fuel cell powertrain 4 along the chilling line 43, a port of the fourth valve 54 toward the cooling line 44 may be closed, such that the chilling air may not flow into the cooling line 44.

Air compressed by the compressor 20 may be supplied to the air supply device 5 of the fuel cell stack along the first air supply line 37 branched from the bootstrap line 31.

In this case, ports of the second valve 52 and the third valve 53 toward the second heating line 34 may be closed, such that the compressed air may not flow into the second heating line 34.

The high-temperature second atmosphere, passing through the heat exchanger 30, may flow along the first heating line 33. However, a port of the first valve 51 toward the heating heat exchanger 32 may be closed, and the high-temperature second atmosphere may be exhausted out of the aircraft through the second exhaust line 36.

Heating, cooling, and dehumidification of the interior space 3 may be performed in a cruise mode. In the drawings, a flow path indicated by a relatively thick solid line indicates a flow path through which air flows, and an open port indicated by an empty triangle in a three-way valve or a four-way valve indicates a flow of air.

In order to help clear understanding, external air flowing in the environmental control device in the cruise mode may be classified into first ram air, second ram air, third ram air, compressed air, chilling air, heating air, and cooling air. It should be noted that the first ram air, second ram air, third ram air, chilling air, heating air, or cooling air has the same chemical composition although there is a change in temperature, pressure, and the like.

Figure 5:
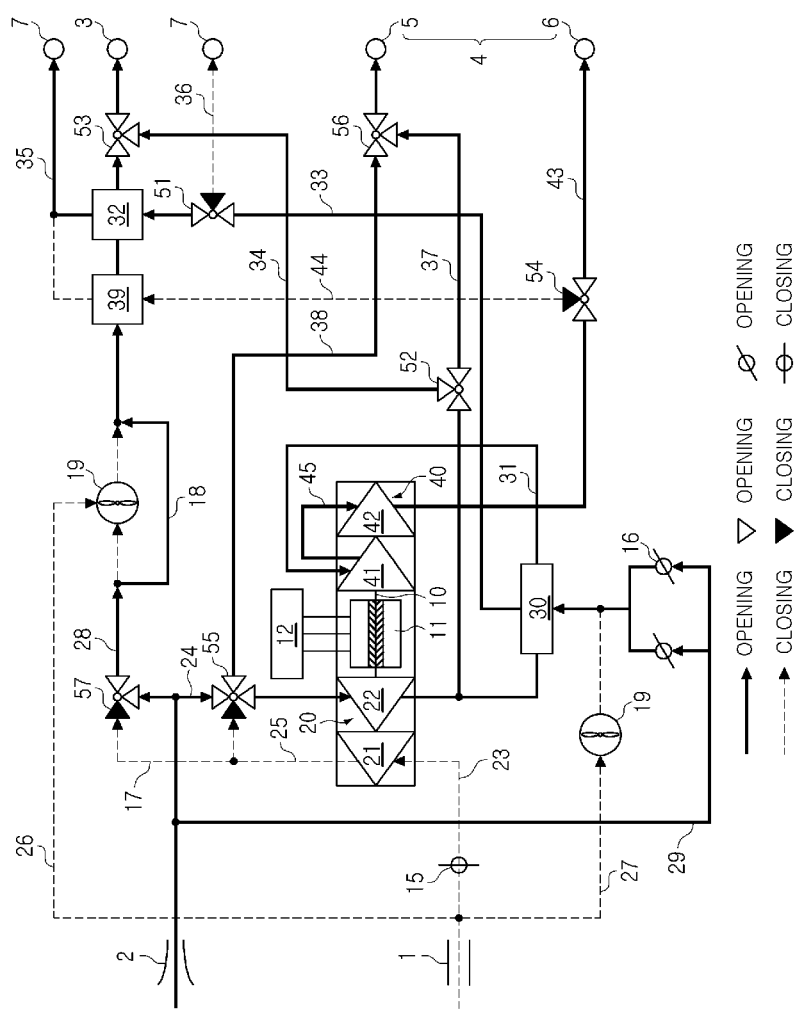
FIG. 5 is a diagram illustrating a case in which an environmental control device of an aircraft operates for heating of an interior space in a cruise mode.

FIG. 5 is a diagram illustrating a case in which an environmental control device of an aircraft operates for heating of an interior space in a cruise mode.

In a cruise mode, the first ram air may be compressed to become compressed air having a raised temperature. Before a heat exchange operation, a portion of the compressed air may be supplied to the interior space 3 of the aircraft. In the heat exchange operation, the second ram air may exchange heat with the compressed air to become the second ram air having a raised temperature. The second ram air having a raised temperature may exchange heat with the third ram air, flowing into the interior space 3, to heat the interior space 3.

In an example, in the cruise mode, the second on-off valve 16 may be opened to be ON, a port of the fifth valve 55 toward the second external air line 24, a port of the pressurization line 25 toward the second stage compressor 22, and a port of the pressurization line 25 toward the second air supply line 38 may be opened, and a port of the seventh valve 57 toward the second external air line 24 and a port of the seventh valve 57 toward the third introduction line 28 may be opened. The motor 11 may be driven by power from the inverter 12 to rotate the shaft 10. Thus, the compressor 20 and the turbine 40 may rotate.

External air around the aircraft may be introduced into the aircraft through the second air scoop 2, and first ram air flowing along the second external air line 24 may flow up to the compressor 20. If a plurality of compressors 20 are provided, the first ram air may enter an inlet of the second stage compressor 22 through the pressurization line 25, and may be adiabatically compressed to become compressed air having a raised temperature. The compressed air may flow out of an outlet of the second stage compressor 22 and flow up to the heat exchanger 30 along the bootstrap line 31.

In this case, a port of the pressurization line of the fifth valve 55 toward the first stage compressor 21 may be closed. The first on-off valve 15 of the first external air line 23 may be closed, and the air intake fans 19 disposed in the first introduction line 26 and the second introduction line 27 may not operate. Even if external air is introduced from the first air scoop 1, external air in the first external air line 23 may not flow in the environmental control device, in particular, the air cycle machine ACM.

In the heat exchanger 30, the compressed air may exchange heat with the second ram air bypassing the compressor 20 from the second air scoop 2 along the fourth introduction line 29. Thus, the second ram air may obtain heat from the compressed air having a raised temperature to become the high-temperature second ram air, and the compressed air may be chilled.

The compressed air, passing through the heat exchanger 30, may continue to flow up to the turbine 40 along the bootstrap line 31. If a plurality of turbines 40 are provided, the compressed air may enter an inlet of the first stage turbine 41, and may be primarily adiabatically expanded to become chilled chilling air. The chilling air may flow out of an outlet of the first stage turbine 41 and may flow along the expansion line 45.

The primarily expanded chilling air may enter an inlet of the second stage turbine 42 through the expansion line 45. The primarily expanded chilling air may be secondarily adiabatically expanded in the second stage turbine 42 to become further chilled chilling air. The chilling air may be supplied from an outlet of the second stage turbine to the heat dissipator 6 of the fuel cell powertrain 4 along the chilling line 43.

In this case, a port of the fourth valve 54 toward the cooling line 44 may be closed, such that the chilling air may not flow into the cooling line 44.

Air compressed by the compressor 20 may be supplied to the air supply device 5 of the fuel cell stack along the first air supply line 37 branched from the bootstrap line 31.

In this case, a port of the second valve 52 toward the second heating line 34 may be opened, and the compressed air having a raised temperature may be supplied to the interior space 3 through the first introduction line 26 with a predetermined pressure. Thus, heating of the interior space 3 may be performed.

The first ram air, autonomously having a predetermined pressure, may be supplied to the air supply device 5 of the fuel cell stack along the second air supply line 38 branched from the second external air line 24. The high-temperature second ram air, passing through the heat exchanger 30, may flow up to the heating heat exchanger 32 along the first heating line 33.

In the heating heat exchanger 32, the high-temperature second ram air may exchange heat with the third ram air flowing from the second air scoop 2 along the third introduction line 28 and passing through the bypass line 18. Thus, the third ram air may obtain heat from the high-temperature second ram air to become high-temperature heating air, and may be supplied to the interior space 3. Accordingly, heating of the interior space 3 may be additionally performed.

The heat-exchanged second ram air may be exhausted out of the aircraft through the first exhaust line 35.

Figure 6:
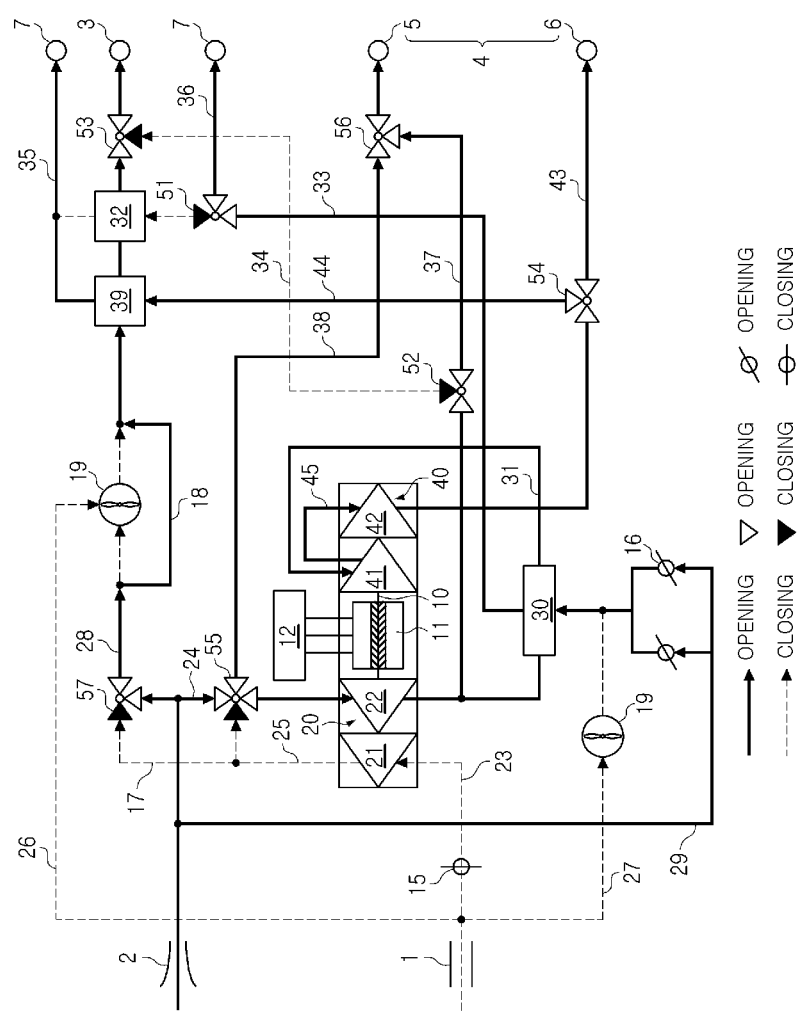
FIG. 6 is a diagram illustrating a case in which an environmental control device of an aircraft operates for cooling of an interior space in a cruise mode.

FIG. 6 is a diagram illustrating a case in which an environmental control device of an aircraft operates for cooling of an interior space in a cruise mode.

In a cruise mode, first ram air may be compressed. The compressed first ram air may exchange heat with second ram air, and may be expanded to form chilling air. Part of the chilling air may exchange heat with third ram air, flowing into the interior space 3 of the aircraft, to cool the interior space 3.

A process in which external air is introduced into the aircraft through the second air scoop 2 and passes through the air cycle machine ACM to become chilling air, and the chilling air is supplied to the heat dissipator 6 of the fuel cell powertrain 4 along the chilling line 43 is the same as that described with reference to FIG. 5.

If the chilling air is supplied to the heat dissipator 6 of the fuel cell powertrain 4 along the chilling line 43, a port of the fourth valve 54 toward the cooling line 44 may also be opened, such that the chilling air may flow up to the cooling heat exchanger 39 along the cooling line 44.

In the cooling heat exchanger 39, the chilling air may exchange heat with the third ram air flowing from the second air scoop 2 along the third introduction line 28 and passing through the bypass line 18. Thus, heat of the third ram air may be taken away by the chilling air, so that the third ram air may become low-temperature cooling air, and may be supplied to the interior space 3. Accordingly, cooling of the interior space 3 may be performed.

The heat-exchanged cooling air may be exhausted out of the aircraft through the first exhaust line 35.

Air compressed by the compressor 20 may be supplied to the air supply device 5 of the fuel cell stack along the first air supply line 37 branched from the bootstrap line 31.

In this case, ports of the second valve 52 and the third valve 53 toward the second heating line 34 may be closed, such that the compressed air may not flow into the second heating line 34.

The first ram air, autonomously having a predetermined pressure, may be supplied to the air supply device 5 of the fuel cell stack along the second air supply line 38 branched from the second external air line 24.

The high-temperature second ram air, passing through the heat exchanger 30, may flow along the first heating line 33. However, a port of the first valve 51 toward the heating heat exchanger 32 may be closed, such that the high-temperature second ram air may be exhausted out of the aircraft through the second exhaust line 36.

Figure 7:
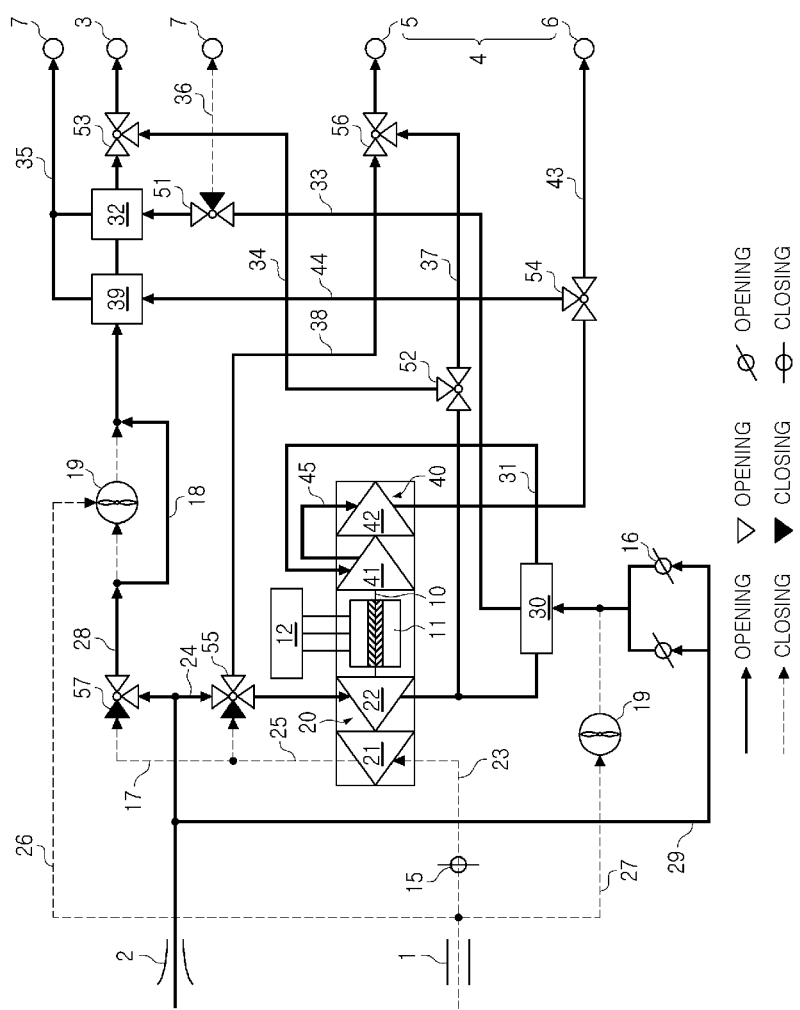
FIG. 7 is a diagram illustrating a case in which an environmental control device of an aircraft operates for dehumidification of an interior space in a cruise mode.

FIG. 7 is a diagram illustrating a case in which an environmental control device of an aircraft operates for dehumidification of an interior space in a cruise mode.

In a cruise mode, first ram air is compressed to become compressed air having a raised temperature. Before a heat exchange operation, a portion of the compressed air may be supplied to the interior space 3 of the aircraft, and the compressed air may exchange heat with the second ram air, and may be expanded to form chilling air. Part of the chilling air may exchange heat with third ram air flowing into the interior space 3. In the heat exchange operation, the second ram air may exchange heat with the compressed air to become second ram air having a raised temperature. The second ram air having a raised temperature may exchange heat with third ram air to dehumidify the interior space 3.

A process in which external air is introduced into the aircraft through the second air scoop 2 and passes through the air cycle machine ACM to become chilling air, and the chilling air is supplied to the heat dissipator 6 of the fuel cell powertrain 4 along the chilling line 43 is the same as that described with reference to FIG. 5.

If the chilling air is supplied to the heat dissipator 6 of the fuel cell powertrain 4 along the chilling line 43, a port of the fourth valve 54 toward the cooling line 44 may also be opened, such that the chilling air may flow up to the cooling heat exchanger 39 along the cooling line 44.

In the cooling heat exchanger 39, the chilling air may exchange heat with the third ram air flowing from the second air scoop 2 along the third introduction line 28 and passing through the bypass line 18. Thus, heat of the third ram air may be taken away by the chilling air, so that the third ram air may become low-temperature cooling air.

The heat-exchanged cooling air may be exhausted out of the aircraft through the first exhaust line 35.

The high-temperature second ram air, passing through the heat exchanger 30, may flow up to the heating heat exchanger 32 along the first heating line 33.

In the heating heat exchanger 32, the high-temperature second ram air may exchange heat with low-temperature cooling air. Thus, the cooling air may have an appropriate temperature by obtaining heat from the high-temperature second ram air. As a result, third ram air may become cooling air with controlled humidity.

The heat-exchanged second ram air may be exhausted out of the aircraft through the first exhaust line 35.

Air compressed by the compressor 20 may be supplied to the air supply device 5 of the fuel cell stack along the first air supply line 37 branched from the bootstrap line 31.

In this case, the port of the second valve 52 toward the second heating line 34 may be opened, and the compressed air having a raised temperature may be supplied to the interior space 3 through the first introduction line 26 with a predetermined pressure.

Accordingly, the compressed air having a raised temperature and the cooling air having a predetermined temperature may be joined, such that air having controlled humidity and temperature may be supplied to the interior space 3.

The first ram air, autonomously having a predetermined pressure, may be supplied to the air supply device 5 of the fuel cell stack along the second air supply line 38 branched from the second external air line 24.

According to an aspect of the present disclosure, there is provided an environmental control device including a shaft installed in an aircraft and coupled to a motor to be rotatable; a compressor connected to the shaft to be rotatable, the compressor adiabatically compressing external air introduced into the aircraft to form a flow of compressed air having a raised temperature; a heat exchanger allowing heat exchange between the compressed air having a raised temperature and a portion of additional external air introduced into the aircraft; and a turbine connected to the shaft to be rotatable, the turbine adiabatically expanding the heat-exchanged compressed air to form a flow of chilling air.

The aircraft may include a first air scoop through which external air is introduced, a second air scoop through which external air is introduced, a first external air line forming a flow path from the first air scoop to the compressor, and a second external air line forming a flow path from the second air scoop to the compressor. The external air of the second air scoop may be ram air.

The compressor may include a first stage compressor and a second stage compressor. A pressurization line may be connected between an outlet of the first stage compressor and an inlet of the second stage compressor. The first external air line may be connected to an inlet of the first stage compressor. The second external air line may be connected to the pressurization line to be in communication with the second stage compressor.

A first introduction line, connecting the first air scoop and an interior space of the aircraft to each other, and a second introduction line, connecting the first air scoop and the heat exchanger to each other, may be branched from the first external air line. An air intake fan may be installed in each of the first introduction line and the second introduction line.

A first heating line may be connected to the second introduction line downstream of the heat exchanger. A heating heat exchanger may be disposed between the first heating line and the first introduction line.

The environmental control device may further include a first exhaust line connected to the first heating line downstream of the heating heat exchanger, a second exhaust line connected upstream of the heating heat exchanger in the first heating line, and a first valve installed between the first heating line and the second exhaust line.

The environmental control device may further include a bootstrap line allowing an outlet of the compressor and an inlet of the turbine to be in communication with each other, the bootstrap line having the heat exchanger disposed thereon, and a first air supply line branched from the bootstrap line to supply the compressed air to an air supply device in the aircraft.

A second heating line may be connected between the first air supply line and the first introduction line. A second valve may be installed between the first air supply line and the second heating line. A third valve may be installed between the first introduction line and the second heating line.

A third introduction line, connecting the second air scoop and the interior space of the aircraft to each other, and a fourth introduction line, connecting the second air scoop and the heat exchanger to each other, may be branched from the second external air line. The third introduction line may be connected to the first introduction line. The fourth introduction line may be connected to the second introduction line.

The environmental control device may further include a second air supply line connected to the second external air line to supply ram air to an air supply device in the aircraft.

The air supply device may be provided in a fuel cell powertrain of the aircraft to supply air to a fuel cell stack.

A fifth valve may be installed between the second external air line, the second air supply line, and the pressurization line.

The environmental control device may further include a redundancy line connected between the third introduction line and the pressurization line to supply air compressed by the first stage compressor, together with the ram air, and a seventh valve installed between the redundancy line and the third introduction line.

The environmental control device may further include a first on-off valve installed in the first external air line, and a second on-off valve installed in the fourth introduction line. The first on-off valve and the second on-off valve may be opened and closed in opposite manners.

The environmental control device may further include a chilling line connected to the turbine to supply chilling air to a heat dissipator in the aircraft.

The heat dissipator may be provided in a fuel cell powertrain of the aircraft.

A cooling line may be connected to the chilling line. A cooling heat exchanger may be disposed between the cooling line and the first introduction line. A fourth valve may be installed between the cooling line and the chilling line.

According to another aspect of the present disclosure, there is provided a method for operating an environmental control device, the method including forming a flow of compressed air having a raised temperature by adiabatically compressing external air introduced into an aircraft; allowing heat exchange between the compressed air having a raised temperature and a portion of the external air introduced into the aircraft; and forming a flow of chilling air by adiabatically expanding the heat-exchanged compressed air.

When an altitude value of the aircraft is less than a reference altitude value and a temperature value of external air is greater than a reference temperature value, a take-off and landing mode may be executed. When the altitude value of the aircraft is greater than or equal to the reference altitude value and the temperature value of the external air is less than or equal to the reference temperature value, a cruise mode may be executed. In the cruise mode, ram air may be used as external air.

In the take-off and landing mode, external air may include first atmosphere, second atmosphere, and third atmosphere. The first atmosphere may be compressed to become compressed air having a raised temperature. Before the allowing heat exchange, a portion of the compressed air may be supplied to an interior space of the aircraft. In the allowing heat exchange, the second atmosphere may exchange heat with the compressed air to become the second atmosphere having a raised temperature, and then the second atmosphere having a raised temperature may exchange heat with the third atmosphere, flowing into the interior space, to heat the interior space.

In the take-off and landing mode, external air may include first atmosphere, second atmosphere, and third atmosphere. The first atmosphere may be compressed, may exchange heat with the second atmosphere, and may then be expanded to form the chilling air. A portion of the chilling air may exchange heat with the third atmosphere, flowing into the interior space of the aircraft, to cool the interior space.

In the take-off and landing mode, the external air may include first atmosphere and second atmosphere. The first atmosphere may be compressed to become compressed air having a raised temperature. Before the allowing heat exchange, a portion of the compressed air may be supplied to an air supply device in the aircraft. The compressed air may exchange heat with the second atmosphere, and may then be expanded to form the chilling air. The chilling air may be supplied to a heat dissipator in the aircraft.

In the cruise mode, external air may include first ram air, second ram air, and third ram air. The first ram air may be compressed to become compressed air having a raised temperature. Before the allowing heat exchange, a portion of the compressed air may be supplied to an interior space of the aircraft. In the allowing heat exchange, the second ram air may exchange heat with the compressed air to become the second ram air having a raised temperature, and then the second ram air having a raised temperature may exchange heat with the third ram air, flowing into the interior space, to heat the interior space.

In the cruise mode, external air may include first ram air, second ram air, and third ram air. The first ram air may be compressed, may exchange heat with the second ram air, and may then be expanded to form the chilling air. A portion of the chilling air may exchange heat with the third ram air, flowing into an interior space of the aircraft, to cool the interior space.

In the cruise mode, external air may include first ram air, second ram air, and third ram air. The first ram air may be compressed to become compressed air having a raised temperature. Before the allowing heat exchange, a portion of the compressed air may be supplied to an interior space of the aircraft. The compressed air may exchange heat with the second ram air, and may then be expanded to form the chilling air. A portion of the chilling air may exchange heat with the third ram air, flowing into the interior space. In the allowing heat exchange, the second ram air may exchange heat with the compressed air to become the second ram air having a raised temperature, and then the second ram air having a raised temperature may exchange heat with the third ram air to dehumidify the interior space.

In the cruise mode, external air may include first ram air and second ram air. The first ram air may be compressed to become compressed air having a raised temperature. Before the allowing heat exchange, a portion of the compressed air may be supplied to an air supply device in the aircraft. The compressed air may exchange heat with the second ram air, and may then be expanded to form the chilling air. The chilling air may be supplied to a heat dissipator in the aircraft.

As described above, the environmental control device may control air conditioning of the interior space 3 properly using external air as a working fluid in an electric propulsion aircraft without an engine, supply compressed air to the fuel cell stack, and cool a powertrain and avionics equipment.

A weight and volume of a chilling system for the fuel cell powertrain may be reduced, and an air compressor required by a fuel cell may be configured as one compressor of the environmental control device through interlocking, thereby reducing a weight of the fuel cell powertrain.

While various examples have been shown and described above, it will be apparent to those skilled in the art that modifications and variations could be made without departing from the scope of the present disclosure as defined by the appended claims.

What is claimed is:

1. An environmental control device for an aircraft, the environmental control device comprising:
    a motor;
    a shaft coupled to the motor, wherein the motor is configured to rotate the shaft;
    a compressor connected to the shaft, wherein the compressor is configured to compress external air introduced into the aircraft to form a flow of compressed air having a raised temperature;
    a heat exchanger configured to allow a heat exchange between the compressed air having the raised temperature and a portion of additional external air introduced into the aircraft; and
    a turbine coupled to the shaft, wherein the turbine is configured to expand the heat-exchanged compressed air to form a flow of chilling air, wherein:
    a first introduction line, connecting a first air scoop and an interior space of the aircraft, and a second introduction line, connecting the first air scoop and the heat exchanger, are branched from a first external air line forming a flow path from the first air scoop to the compressor,
    a first heating line is connected to the second introduction line downstream of the heat exchanger, and
    a heating heat exchanger is disposed between the first heating line and the first introduction line.

2. The environmental control device of claim 1, wherein the aircraft comprises:
    the first air scoop through which external air is introduced;
    a second air scoop through which external air is introduced;
    the first external air line; and
    a second external air line forming a flow path from the second air scoop to the compressor, and
    wherein the external air of the second air scoop is ram air.

3. The environmental control device of claim 2, wherein the compressor comprises a first stage compressor and a second stage compressor,
    a pressurization line is connected between an outlet of the first stage compressor and an inlet of the second stage compressor,
    the first external air line is connected to an inlet of the first stage compressor, and
    the second external air line is connected to the pressurization line to be in communication with the second stage compressor.

4. The environmental control device of claim 3, wherein a third introduction line, connecting the second air scoop and the interior space of the aircraft, and a fourth introduction line, connecting the second air scoop and the heat exchanger, are branched from the second external air line,
    the third introduction line is connected to the first introduction line, and
    the fourth introduction line is connected to the second introduction line.

5. The environmental control device of claim 4, further comprising:
    a second air supply line connected to the second external air line to supply ram air to a fuel cell powertrain of the aircraft.

6. The environmental control device of claim 5, wherein a fifth valve is coupled to the second external air line, the second air supply line, and the pressurization line.

7. The environmental control device of claim 5, further comprising:
    a redundancy line connected between the third introduction line and the pressurization line to supply air compressed by the first stage compressor, together with the ram air; and
    a seventh valve installed between the redundancy line and the third introduction line.

8. The environmental control device of claim 5, further comprising:
    a first on-off valve installed in the first external air line; and
    a second on-off valve installed in the fourth introduction line,
    wherein the first on-off valve and the second on-off valve are configured to be opened and closed.

9. The environmental control device of claim 1, wherein an air intake fan is installed in each of the first introduction line and the second introduction line.

10. The environmental control device of claim 1, further comprising:
    a first exhaust line connected to the first heating line downstream of the heating heat exchanger;
    a second exhaust line connected upstream of the heating heat exchanger in the first heating line; and
    a first valve installed between the first heating line and the second exhaust line.

11. The environmental control device of claim 1, further comprising:
    a bootstrap line allowing an outlet of the compressor and an inlet of the turbine to be in communication with each other, wherein the bootstrap line has the heat exchanger disposed thereon; and
    a first air supply line branched from the bootstrap line to supply the compressed air to a fuel cell powertrain of the aircraft.

12. The environmental control device of claim 11, wherein
    a second heating line is connected between the first air supply line and the first introduction line,
    a second valve is installed between the first air supply line and the second heating line, and
    a third valve is installed between the first introduction line and the second heating line.

13. The environmental control device of claim 1, further comprising:
a chilling line connected to the turbine to supply chilling air to a heat dissipator in the aircraft.

14. The environmental control device of claim 13, wherein
the heat dissipator is a heat dissipator of a fuel cell powertrain of the aircraft,
a cooling line is connected to the chilling line,
a cooling heat exchanger is disposed between the cooling line and the first introduction line, and
a fourth valve is installed between the cooling line and the chilling line.

15. The environmental control device of claim 1, wherein the compressor is configured to adiabatically compress the external air, and wherein the turbine is configured to adiabatically expand the heat-exchanged compressed air.

16. A device for an aircraft, the device comprising:
a motor;
a shaft coupled to the motor, wherein the motor is configured to rotate the shaft;
a compressor connected to the shaft, wherein the compressor is configured to compress external air introduced into the aircraft to form a flow of compressed air having a raised temperature;
a heat exchanger configured to allow a heat exchange between the compressed air having the raised temperature and a portion of additional external air introduced into the aircraft; and
a turbine coupled to the shaft, wherein the turbine is configured to expand the heat-exchanged compressed air to form a flow of chilling air, wherein:
a first introduction line, connecting a first air scoop and an interior space of the aircraft, and a second introduction line, connecting the first air scoop and the heat exchanger, are branched from a first external air line forming a flow path from the first air scoop to the compressor,
a third introduction line, connecting a second air scoop and the interior space of the aircraft, and a fourth introduction line, connecting the second air scoop and the heat exchanger, are branched from a second external air line forming a flow path from the second air scoop to the compressor,
the third introduction line is connected to the first introduction line, and
the fourth introduction line is connected to the second introduction line.

17. The device of claim 16, wherein the compressor is configured to adiabatically compress the external air.

18. A device for an aircraft, the device comprising:
a motor;
a shaft coupled to the motor, wherein the motor is configured to rotate the shaft;
a compressor connected to the shaft, wherein the compressor is configured to compress external air introduced into the aircraft to form a flow of compressed air having a raised temperature;
a heat exchanger configured to allow a heat exchange between the compressed air having the raised temperature and a portion of additional external air introduced into the aircraft;
a turbine coupled to the shaft, wherein the turbine is configured to expand the heat-exchanged compressed air to form a flow of chilling air; and
a chilling line connected to the turbine to supply chilling air to a heat dissipator of the aircraft, wherein:
a cooling line is connected to the chilling line,
a cooling heat exchanger is disposed between the cooling line and a first introduction line, and
a valve is installed between the cooling line and the chilling line.

19. The device of claim 18, wherein the turbine is configured to adiabatically expand the heat-exchanged compressed air.

* * * * *